United States Patent
Senese et al.

(10) Patent No.: US 9,232,376 B2
(45) Date of Patent: Jan. 5, 2016

(54) CONCURRENT VOICE AND DATA SERVICE ON A SAME DIGITAL RADIO CHANNEL

(71) Applicant: MOTOROLA SOLUTIONS, INC, Schaumburg, IL (US)

(72) Inventors: Thomas J Senese, Schaumburg, IL (US); Nathanael P Kuehner, Rolling Meadows, IL (US); Todd A Leigh, East Lansing, MI (US); Harish Natarahjan, Streamwood, IL (US); Robert J Novorita, Orland PK, IL (US); Mark Shahaf, Vernon Hills, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 181 days.

(21) Appl. No.: 13/963,293

(22) Filed: Aug. 9, 2013

(65) Prior Publication Data
US 2015/0043539 A1    Feb. 12, 2015

(51) Int. Cl.
*H04W 4/20*   (2009.01)
*H04W 4/10*   (2009.01)
*H04W 76/00*  (2009.01)
*H04M 11/06*  (2006.01)

(52) U.S. Cl.
CPC .............. *H04W 4/20* (2013.01); *H04M 11/06* (2013.01); *H04M 11/066* (2013.01); *H04W 76/005* (2013.01); *H04W 4/10* (2013.01); *H04W 76/007* (2013.01)

(58) Field of Classification Search
None
See application file for complete search history.

(56) References Cited

U.S. PATENT DOCUMENTS

| | | | |
|---|---|---|---|
| 5,654,964 A | 8/1997 | Wake | |
| 5,790,532 A | 8/1998 | Sharma et al. | |
| 8,116,723 B2* | 2/2012 | Kaltsukis | 455/404.2 |
| 2002/0089948 A1* | 7/2002 | Pucheu-Marque | 370/329 |
| 2004/0243913 A1* | 12/2004 | Budge et al. | 714/776 |
| 2007/0206624 A1* | 9/2007 | Majima | 370/433 |
| 2010/0099400 A1 | 4/2010 | Lefeuvre | |
| 2010/0159973 A1* | 6/2010 | Thomas et al. | 455/509 |
| 2011/0150219 A1* | 6/2011 | Newberg et al. | 380/255 |
| 2012/0149324 A1* | 6/2012 | Daly | 455/404.1 |
| 2013/0117018 A1* | 5/2013 | O'Sullivan et al. | 704/235 |

FOREIGN PATENT DOCUMENTS

WO    2011053441 A1    5/2011

* cited by examiner

*Primary Examiner* — Redentor Pasia
(74) *Attorney, Agent, or Firm* — Kenneth A. Haas

(57) ABSTRACT

A method, a subscriber unit, and a system provide concurrent voice and data systems and methods that "steal bits" from voice frames for low-speed concurrent data. In this manner, concurrent voice and data is supported over protocols that require voice-only in current operation such as Project 25 (P25). The stealing of bits from voice is done in a manner that is transparent and not noticeable to users. The systems and methods enable replication of signaling on the downlink and wireline segments that is replaced on the uplink, encoding of interleaving blocks that extend across multiple Layer 2 voice logical data units (LDUs), flexibility in replacing voice data in LDUs, indication of the availability of the service and an interleaving schedule, notification of upcoming stealing events via signaling, and the like.

15 Claims, 15 Drawing Sheets

| AUDIO TIME | | DATA UNIT | SCHEDULE 1 NO AUDIO STEALING | | | | SCHEDULE 2 20/360 AUDIO STEALING | | | | SCHEDULE 3 ONLY LC & LSD STEALING | | | |
|---|---|---|---|---|---|---|---|---|---|---|---|---|---|---|
| START | END | | XMBE | LC | ES | LSD | XMBE | LC | ES | LSD | XMBE | LC | ES | LSD |
| 0 | 0 | VHDR | | | ES | | | | ES | | | | ES | |
| 0 | 180 | LDU1 | XMBE | LC | | LSD | XMBE +144 | LC | | 32 | XMBE | LC | | LSD |
| 180 | 360 | LDU2 | XMBE | | ES | LSD | XMBE | | ES | 32 | XMBE | | ES | LSD |
| 360 | 540 | LDU1 | XMBE | LC | | LSD | XMBE +144 | LC | | 32 | XMBE | LC | | LSD |
| 540 | 720 | LDU2 | XMBE | | ES | LSD | XMBE | | ES | 32 | XMBE | | ES | LSD |
| 720 | 900 | LDU1 | XMBE | LC | | 32 | XMBE +144 | LC | | 32 | XMBE | LC | | LSD |
| 900 | 1080 | LDU2 | XMBE | | ES | 32 | XMBE | | ES | 32 | XMBE | | ES | 32 |
| 1080 | 1260 | LDU1 | XMBE | 240 | | 32 | XMBE +144 | 240 | | 32 | XMBE | 240 | | 32 |
| 1260 | 1440 | LDU2 | XMBE | | ES | 32 | XMBE | | ES | 32 | XMBE | | ES | 32 |
| 1440 | 1620 | LDU1 | XMBE | 240 | | 32 | XMBE +144 | 240 | | 32 | XMBE | 240 | | 32 |
| 1620 | 1800 | LDU2 | XMBE | | 240 | 32 | XMBE | | 240 | 32 | XMBE | | ES | 32 |
| 1800 | 1980 | LDU1 | XMBE | 240 | | 32 | XMBE +144 | 240 | | 32 | XMBE | 240 | | 32 |
| 1980 | 2160 | LDU2 | XMBE | | 240 | 32 | XMBE | | 240 | 28 | XMBE | | ES | 32 |
| 2160 | 2340 | LDU1 | XMBE | 240 | | 32 | XMBE +144 | 240 | | 32 | XMBE | 240 | | LSD |
| 2340 | 2520 | LDU2 | XMBE | | 240 | LSD | XMBE | | 240 | 32 | XMBE | | ES | 32 |
| 2520 | 2700 | LDU1 | XMBE | 240 | | 32 | XMBE +144 | 240 | | 32 | XMBE | 240 | | 32 |
| 2700 | 2880 | LDU2 | XMBE | | 240 | 32 | XMBE | | 240 | 28 | XMBE | | ES | 32 |
| 2880 | 3060 | LDU1 | XMBE | 240 | | LSD | XMBE +144 | 240 | | 32 | XMBE | 240 | | 32 |
| 3060 | 3240 | LDU2 | XMBE | | 240 | 32 | XMBE | | 240 | 32 | XMBE | | ES | 32 |
| 3240 | 3420 | LDU1 | XMBE | 240 | | 32 | XMBE +144 | 240 | | 32 | XMBE | 240 | | 32 |
| 3420 | 3600 | LDU2 | XMBE | | 240 | LSD | XMBE | | 240 | 28 | XMBE | | ES | 32 |
| 3600 | 3780 | LDU1 | XMBE | 240 | | 32 | XMBE +144 | 240 | | 32 | XMBE | 240 | | LSD |
| 3780 | 3960 | LDU2 | XMBE | | 240 | 32 | XMBE | | 240 | 32 | XMBE | | ES | 32 |
| 3960 | 4140 | LDU1 | XMBE | 240 | | LSD | XMBE +144 | 240 | | 32 | XMBE | 240 | | 32 |
| 4140 | 4320 | LDU2 | XMBE | | 240 | 32 | XMBE | | 240 | 28 | XMBE | | ES | 32 |
| 4320 | 4500 | LDU1 | XMBE | 240 | | 32 | XMBE +144 | 240 | | 32 | XMBE | 240 | | 32 |
| 4500 | 4680 | LDU2 | XMBE | | 240 | LSD | XMBE | | 240 | 32 | XMBE | | ES | 32 |
| 4680 | 4860 | LDU1 | XMBE | LC | | LSD | XMBE +144 | 240 | | 32 | XMBE | 240 | | 32 |
| 4860 | 5040 | LDU2 | XMBE | | ES | LSD | XMBE | | 240 | 28 | XMBE | | ES | 32 |
| 5040 | 5220 | LDU1 | XMBE | LC | | LSD | XMBE | LC | | LSD | XMBE | 240 | | LSD |
| 5220 | 5400 | LDU2 | XMBE | | ES | LSD | XMBE | | ES | LSD | XMBE | | ES | LSD |
| 5400 | 5580 | LDU1 | XMBE | LC | | LSD | XMBE | LC | | LSD | XMBE | LC | | LSD |
| 5580 | 5760 | LDU2 | XMBE | | ES | LSD | XMBE | | ES | LSD | XMBE | | ES | LSD |
| | | | ETC. | | | | ETC. | | | | ETC. | | | |
| POSTPENDED CONC DATA LDU | | | 1100 | | 240 | 32 | 1100 | | 240 | 32 | 1100 | | 240 | 32 |

CONCURRENT VOICE AND DATA SERVICE ON A SAME DIGITAL RADIO CHANNEL

BACKGROUND OF THE INVENTION

The present disclosure relates to wireless communication systems and methods such as digital radio systems including land mobile radio systems (also known as public land mobile radio or private land mobile radio). Various communication protocols exist for such systems including, without limitation, Project 25 (P25), Terrestrial Trunked Radio (TETRA), Digital Mobile Radio (DMR), Public Safety Long Term Evolution (LTE), and the like. In a P25 compliant trunked system, a subscriber radio engaged in a voice transmission on a dedicated channel has a limited capability to send data messages as a concurrent service. Conventionally, a radio that is operating on the voice channel must leave that channel in order to transmit data. For example, a subscriber radio must send an Internet Protocol (IP) datagram on the dedicated packet data channel, which means that it cannot participate in voice communications during that time. Therefore, a device has to decide which service has a priority at a given time. Nevertheless, there are cases where both services may have an equal importance and need to provide some degree of co-existence.

Accordingly, there is a need for concurrent voice and data service on a same digital radio channel.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a table of exemplary schedules implementing the concurrent voice and data systems and methods in accordance with some embodiments.

Figure 1:
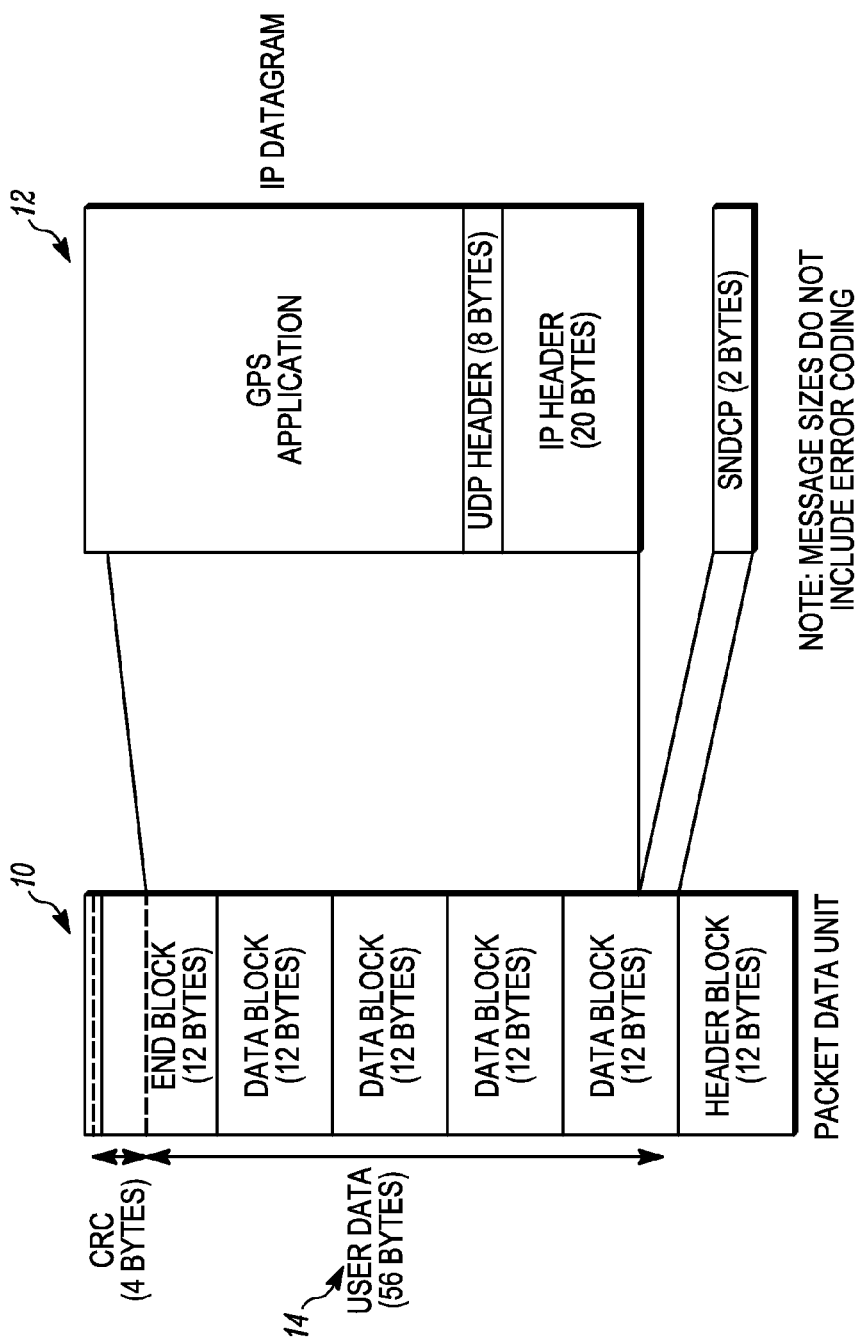
FIG. 1 is a block diagram of a P25 FDMA packet data unit (PDU) and an IP datagram for GPS applications in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method includes operating a voice transmission on a land-mobile radio channel; determining a need to transmit one or more data packet data units (PDUs) concurrently with the voice transmission; selecting one or more voice PDUs on the land-mobile radio channel to steal bits therein to transport the one or more data PDUs concurrently with the voice transmission; coordinating a schedule to steal the bits between a subscriber unit and a base radio; and transmitting the one or more data PDUs according to the schedule as the concurrent service with voice.

In another exemplary embodiment, a subscriber unit includes a wireless network interface; a processor communicatively coupled to the wireless network interface; and memory storing instructions that, when executed, cause the processor to perform the steps of: operate a voice transmission on a land-mobile radio channel; determine a need to transmit one or more data packet data units (PDUs) concurrently with the voice transmission; select one or more voice PDUs on the land-mobile radio channel to steal bits therein to transport the one or more data PDUs concurrently with the voice transmission; coordinate a schedule to steal the bits with a base radio; and transmit the one or more data PDUs according to the schedule as the concurrent service with voice.

In yet another exemplary embodiment, a system includes at least one subscriber unit; a base radio communicatively coupled to the at least one subscriber unit; a Gateway General packet radio service Support Node communicatively coupled to the base radio; a voice transmission on a land-mobile radio channel operating according to Project 25 between the at least one subscriber unit and the base radio; and a data transmission concurrently on the land-mobile radio channel with the voice transmission, wherein the data transmission is performed by stealing one or more bits in the voice transmission, the one or more bits comprising signaling and/or voice data.

In various exemplary embodiments, concurrent voice and data systems and methods are described that "steal bits" from voice frames and/or embedded signaling segments for low-speed concurrent data. In this manner, concurrent voice and data is supported over protocols that require voice-only in current operation. The stealing of bits from voice is done in a manner that is transparent and not noticeable to users. Without a loss of generality, this disclosure is described in more detail with a reference to a particular use case, namely sending periodic location updates over the P25 Frequency Division Multiple Access (FDMA) system; however, the proposed mechanisms described herein are directly applicable to other use cases that would require similar capability as well as other air interfaces being contemplated such as P25 TDMA, TETRA, DMR, etc. For example, an exemplary end user demand is that subscriber radios that enter Emergency Mode should be able to transmit relatively frequent location updates, without leaving the voice channel whilst in normal operation, and without introducing any additional delays or substantial audio truncation during call setup. Other critical use cases can include Man Down, Remote Monitor, Soldier Mack and Radio User Biometrics. In all of these scenarios, a conventional P25 radio cannot send mission critical data while currently transmitting voice. In various exemplary embodiments, the low-speed concurrent data described herein can be used for the aforementioned scenarios.

FIG. 1 is a block diagram of a P25 FDMA protocol data unit (PDU) 10 and an IP datagram 12 for location (e.g. GPS, GLONASS, Compass, Galileo, etc.) applications in accordance with some embodiments. Again, reference is made herein for illustration purposes with respect to the P25 FDMA standards for describing concurrent voice and data systems and methods. The PDU 10 includes user data 14 which includes data blocks, a header block, an end block, and cyclic redundancy check (CRC) data. The IP datagram 12 includes GPS application data, a user datagram protocol (UDP) header, an IP header, and a sub network data convergence protocol (SNDCP) header. The concurrent voice and data systems and methods described herein enable, in an exemplary embodiment, a transmitting P25 subscriber radio to support voice and packet data services concurrently. The proposed mechanism for concurrent use of the channel takes advantage of P25 standard protocols and message structure to enable transport of the IP datagram 12 within the PDU 10. While GPS data is described as an exemplary piece of data that may be transmitted in accordance with the disclosed methods and systems, in other embodiments, other types of data may be transmitted as well.

Figure 2:
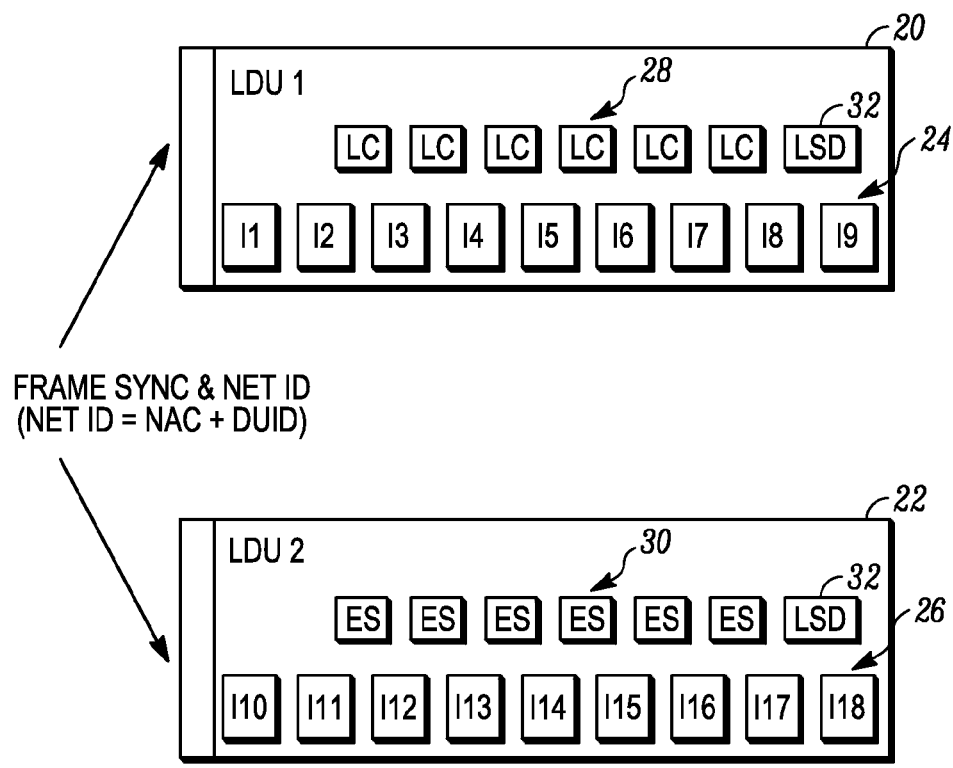
FIG. 2 is a block diagram of P25 FDMA logical data units (LDUs) in accordance with some embodiments.

FIG. 2 is a block diagram of P25 FDMA logical data units (LDUs) 20, 22 in accordance with some embodiments. The P25 standard defines embedded Link Control signaling within the FDMA voice stream. The P25 standards are promulgated by the Project 25 Technology Interest Group. Exemplary descriptions are available in the Telecommunications Industry Association (TIA) 102.BAAA-A-2003, "FDMA Common Air Interface—New Technology Standards Project—Digital Radio Technical Standards," September 2003 and TIA 102.AABF-B, "Link Control Word Formats and Message," December 2012, the contents of each are incorporated by reference herein. These standards provide a framework where new Link Control messages can be added. A single Link Control 28 message is sent every 360 ms, and contains 9 bytes of user data (before error coding). It would be inefficient to embed a packet data unit (PDU) within the Link Control messages, due to the relatively slow update rate. For example, a typical GPS location PDU includes 72 bytes (before error coding), and it would take over 2.5 seconds to send this PDU within the Link Control messages. In addition, this approach is likely to have relatively low reliability unless additional error coding were added (which would further increase the transmission time). The P25 standard also defines embedded Low Speed Data signaling 32 with the FDMA voice stream. There are 4 bytes of user data (before error coding) that are sent every 360 ms. Low Speed Data is over four times slower than Link Control.

Each of the LDUs 20, 22 include a frame synch and network identification header with the network ID being a network access code (NAC) and a Data Unit ID (DUID). Each P25 FDMA LDU 20, 22 includes nine frames of vocoded voice data frames 24, 26 (labeled in FIG. 2 as I1 through I18). The vocoder for P25 FDMA voice is Improved Multi-Band Excitation (IMBE). Each IMBE voice frame 24, 26 contains 20 ms of audio, and NK_NK_RS includes 144 bits (including error coding). For embedded signaling segments, the LDU1 20 includes six segments of Link Control (LC) 28 and the LDU2 includes six segments of Encryption Sync (ES) 30, where the sum of all embedded signaling segments within the LDU includes 240 bits (including error coding). The LDUs 20, 22 both have a serialization time of 180 ms on the FDMA P25 air interface. Each LDU 20, 22 also includes a 32 bit Low Speed Data (LSD) 32 field (including error coding).

The P25 Phase 2 TDMA air interface, while structured differently from the P25 FDMA air interface, is similar in that it too is divided among voice frames (72 bits each, containing 20 ms of audio each), a general-purpose signaling field ("IEMI") which carries media access control (MAC) messages instead of LCs (276 bits), and Encryption Sync fields (264 bits every 360 ms). Phase 2 does not have any equivalent of Phase 1's Low Speed Data field. The concurrent voice and data systems and methods described herein apply to P25 Phase 1 (FDMA), P25 Phase 2 (TDMA), and other air interfaces as well. As far as the concurrent voice and data systems and methods are concerned, the only difference between P25 FDMA and P25 TDMA is in the specific definitions of the concurrent data schedules they use. The concept of operation of the concurrent voice and data systems and methods is to replace information currently allocated to certain fields within messages carried over the air interface with the data packets of a specific service, and to do this with minimum impact to quality of operation, and without conflicting with P25 standards voice channel interoperability.

FIG. 3 is a table of exemplary schedules 30 implementing the concurrent voice and data systems and methods in accordance with some embodiments. In the concurrent voice and data systems and methods, the schedules 30 are a pre-established set of 'concurrent data schedules' defined as part of the concurrent data protocol. Each of the schedules 30 identifies a specific set of air interface bits that will contain concurrent data packet contingents. FIG. 3 illustrates three exemplary schedules 30 which are labeled as Schedules 1, 2, and 3. Those of ordinary skill in the art will recognize the three schedules 30 are presented for illustration purposes and practical embodiments can include various other schedules or combinations of illustrated schedules. The table includes various columns of audio time (in milliseconds), data unit (VHDR—voice header unit, LDU1, LDU2), and segments of the VHDR, LDU1, and LDU2. For each of the schedules 30, the segments of the VHDR, LDU1, and LDU2 can include XMBE voice data (i.e., either Improved Multi-Band Excitation (IMBE) or Advanced Multiband Excitation (AMBE)), Link Control (LC), Encryption Synchronization (ES), and Low Speed Data (LSD). The rows in the table are indicative of different times.

In an exemplary embodiment, the schedule 1 replaces only the Link Control, Encryption Sync, and Low Speed Data bits with concurrent data bits, the schedule 2 also replaces selected voice frames with concurrent data bits, and the schedule 3 only replaces Link Control and Low Speed Data bits. Other alternative schedules could replace various other combinations of bits, such as only Link Control fields, or only Encryption Sync fields, etc. In the table, concurrent data transmission with voice is shown during highlighted sections 32 of the rows in each of the schedules 30. The concurrent data is shown as bit count totals (e.g. 32, 240, +144) in the table.

Each schedule 30 has a defined beginning point and a defined end point relative to signaling messages which invoke the schedule within a particular transmission. LC data can be used to identify which schedule is being invoked as well as countdown to the beginning of concurrent voice and data transmit. A transmitting radio that wishes to transmit concurrent data selects a particular concurrent data schedule, signals that it will be invoking this schedule within this transmission (i.e., via the LC), and identifies the point in time at which usage of the schedule will begin within the transmission. One exemplary embodiment carries this signaling within P25 link control (LC) messages via a schedule ID and a countdown to the first air interface data unit (LDU) of the schedule. That is, a subscriber unit (SU) and base radio forming an over-the-air (OTA) interface therebetween coordinate stealing events. The P25 LC messages can be used to announce or notify of upcoming stealing events. In another exemplary embodiment, proprietary Outbound Signaling Packet (OSP) signaling (trunking) can be used to announce or notify of upcoming stealing events. In is important to coordinate these stealing events on the OTA interface such that the base radio can replace signaling that is used (e.g., LCs, ES, etc.) on downlinks and/or wireline segments as well as other techniques known to route the data PDUs to their appropriate destination independently of the voice frames.

Figure 4:
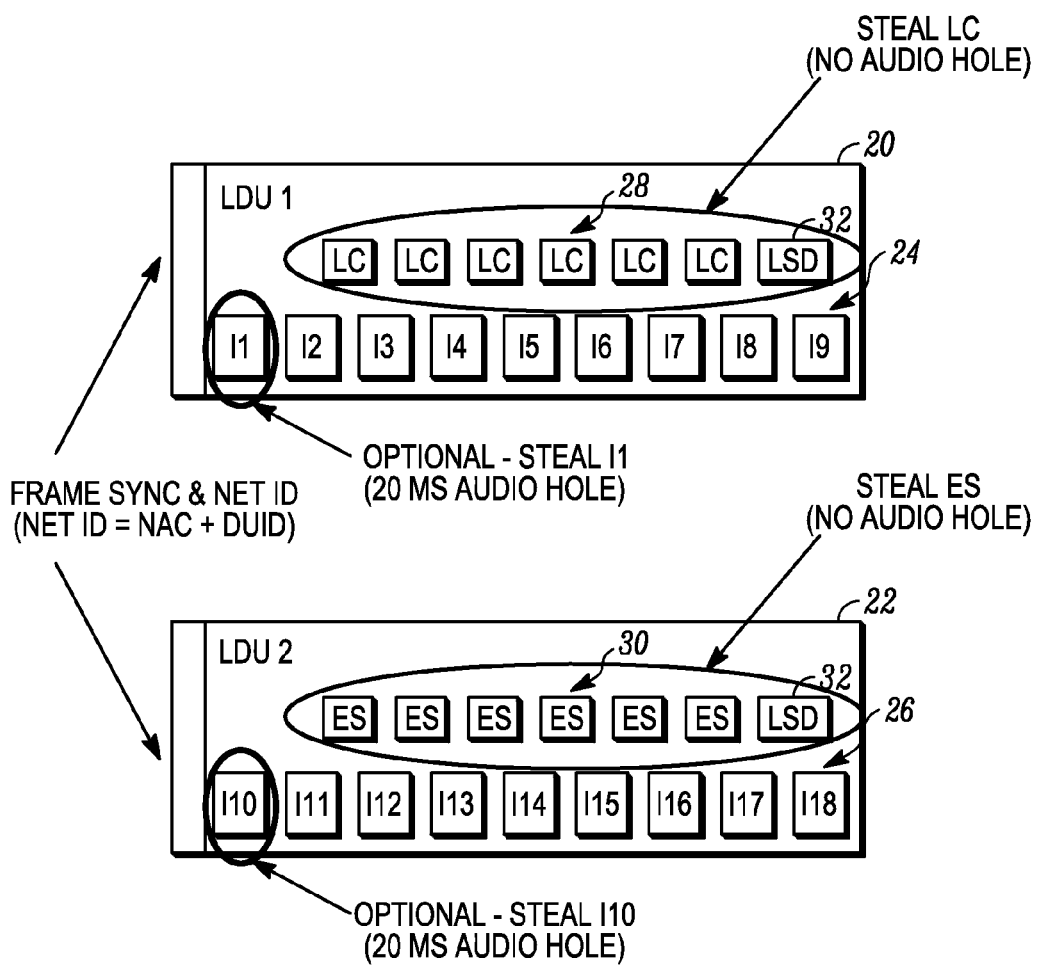
FIG. 4 is a block diagram of the P25 FDMA LDUs from FIG. 2 illustrating exemplary bytes for concurrent data transmission in accordance with some embodiments.

FIG. 4 is a block diagram of the P25 FDMA logical data units (LDUs) 20, 22 from FIG. 2 illustrating exemplary bytes for concurrent data transmission in accordance with some embodiments. In various exemplary embodiments, the concurrent voice and data systems and methods steal any one or more of the LC 28, the ES 30, the LSD 32, and portions of the voice data frames 26. Using the LC 28, the ES 30, and the LSD 32 results in no audio holes in voice transmission while stealing each of the voice data frames 26 results in a 20 ms audio hole. The LC 28 and the ES 30 each include 5 bytes of data whereas the voice data frames 26 each include 18 bytes per Ix where x=1 to 18. Serialization time of each LDU 20, 22 is 180 ms with each LDU 20, 22 containing 180 ms of audio, i.e. 20 ms per IMBE frame. In the schedule 2 from FIG. 3, each of I1 and I10 are stolen for data transmission providing 144 bits (or 18 bytes) of data traffic.

Figure 5:
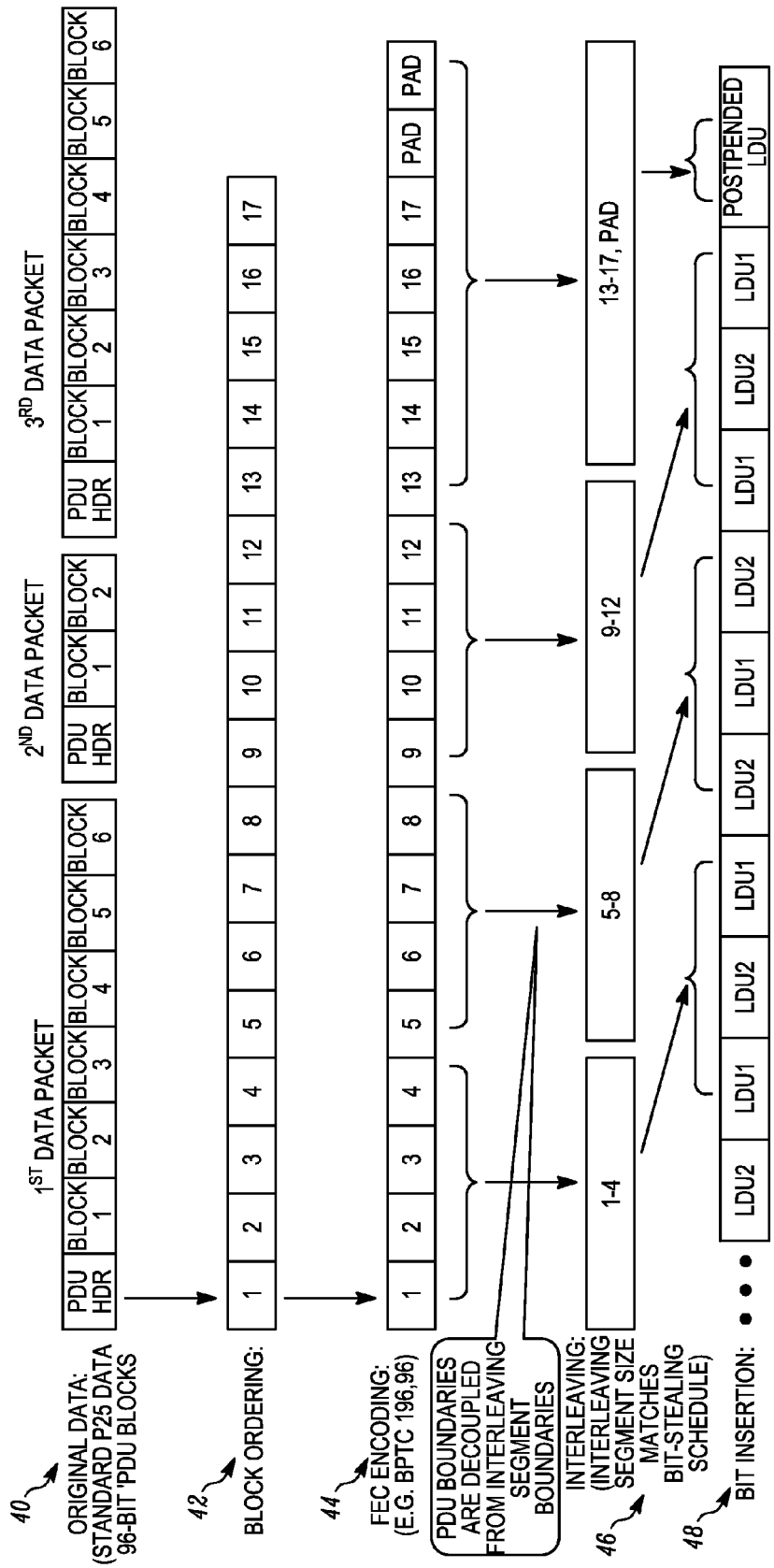
FIG. 5 is a block diagram of mapping PDU data to concurrent data bits in accordance with some embodiments.

FIG. 5 is a block diagram of mapping PDU data to concurrent data bits in accordance with some embodiments. Within a concurrent data schedule, bit 'interleaving segments' are defined in order to decouple the data transport protocol from the size and type of data packets being transported. These 'interleaving segments' spread multiple P25 data blocks together across multiple voice LDUs 20, 22 such that each individual data block has very robust RF fade protection, and hence very high block reliability relative to standard P25 data or relative to the reliability of signaling on a voice channel.

Specifically, in the exemplary embodiment of FIG. 5, original data 40 includes standard P25 data in 96-bit PDU blocks. The transmitting radio formats each concurrent data message into a standard P25 unconfirmed data packet, i.e. a 96-bit P25 'header block' and one or more 96-bit 'data blocks'. For example, three data packets are illustrated in FIG. 5 each with a PDU header and a variable amount of blocks. The first and third data packets are each shown with six blocks and the second data packet is shown with two blocks. The blocks from all messages to be transmitted are concatenated into a single sequence of blocks 42, e.g. the original data is ordered into sequential blocks 42 of 17 total blocks, and are each individually FEC encoded 44. The particular FEC code may be different for different concurrent data schedules. For example, an exemplary embodiment uses a (196, 96) block product code to encode each data block although other codes may be used. The sequence of FEC-encoded data blocks is then segmented into subgroups 46 that match the number of blocks carried by the interleaving segments of the concurrent data schedule being invoked. Finally, the bits of each FEC-encoded block are inserted into their assigned bit position 48 according to the interleaving scheme of the interleaving segment to which the block was allocated.

The receiving radio, upon receiving signaling that invokes a concurrent data schedule, extracts the concurrent data bits from their scheduled bit locations and reconstructs the transmitted data packet(s). The receiving radio also replaces the concurrent data bits with valid P25 contents. Voice frames are marked for 'erasure'. LC fields are populated with a valid LC message. Encryption Sync fields are populated with the correct value, which is regenerated by the receiving radio based on valid Encryption Sync values which were received from the portion of the transmission received prior to the beginning of the concurrent data schedule. A Linear Feedback Shift Register (LFSR) regenerates the Message Indicator (MI) portion of the Encryption Sync.

Additionally, after invoking a concurrent data schedule, the transmitting radio has the option of postpending one or more concurrent data LDUs (P25 Phase 1) or bursts (P25 Phase 2) after the end of its audio transmission. A concurrent data LDU or burst contains only concurrent data payload and the signaling necessary to identify itself as a concurrent data LDU. In this exemplary embodiment, no impact is seen on the voice transmission.

In conjunction with usage of predefined concurrent data schedules, opportunistic xMBE vocoder frame stealing may also be conducted during low energy regions of speech. Stealing voice frames during these intervals will have minimal impact on the synthesized voice quality and intelligibility. All voice transmissions have low to no energy regions that can be exploited for stealing. For example, the TIMIT training speech database has 15% of its speech time as no energy silence. Using this figure as a speech activity baseline, 3 voice frames per 4 seconds of xMBE transmissions could be stolen with no negative impact to voice quality. Relaxing the requirement to "low energy" regions of speech from the "no energy" regions increases the potential space of stolen voice frames. Conservatively the increase could double to six voice frames per four second voice transmission.

The xMBE vocoder's differential gain factor can be used to identify the regions where voice frame stealing may occur with minimal impact to the transmission quality. The xMBE encoder provides a differential gain factor (via the $b_2$ vectors) that tends to follow the speech energy envelope. The differential gain factor does not provide accurate level scaling indications of envelope peaks; however it does provide a good predictor of low to no energy speech regions. It is these low to no energy regions that the stealing algorithm exploits to insert desired data instead of voice data. Furthermore these low to no energy regions of speech are periodic and may be predicted to enable the stealing algorithm to schedule its occurrence. The stolen voice frames may be mitigated on the decoder side by asserting the Lost Frame Indicate flag into the decoder. The Lost Frame Indicate flag causes the last good frame to be repeated thus minimizing the quality impact of the stolen frame.

By allowing a subscriber unit (SU) to send Packet Data PDUs during transmission of voice on a voice channel, the SU does not need to choose one service over another (voice instead of packet data, for example) and can deliver packet data PDUs in a more timely, bandwidth-efficient, and more reliable fashion than the current implementation using channels dedicated strictly to voice or packet data service. Careful selection of the schedule in terms of whether it steals voice frames, LCs, or ES blocks as described in the concurrent voice and data systems and methods can minimize the impact of the stealing on the voice quality and supplementary services of the voice call. This would allow, for example, an emergency location report to be provided earlier than conventional implementations, and with greater reliability than the conventional implementations. The time savings may be even greater if the emergency call lasts longer than a single voice transmission+hang time.

The mechanisms in this concurrent voice and data systems and methods may be applicable on other air interface protocols, such as TETRA, DMR, Public Safety LTE, etc. The common operations for each include: 1) stolen bits in the uplink with regeneration of the stolen bits at the fixed network equipment (FNE), 2) LLC interleaving segments that span across FDMA frames or TDMA bursts, and 3) pre-set stealing schedules that can be signaled via a 'countdown to start'.

Figure 6:
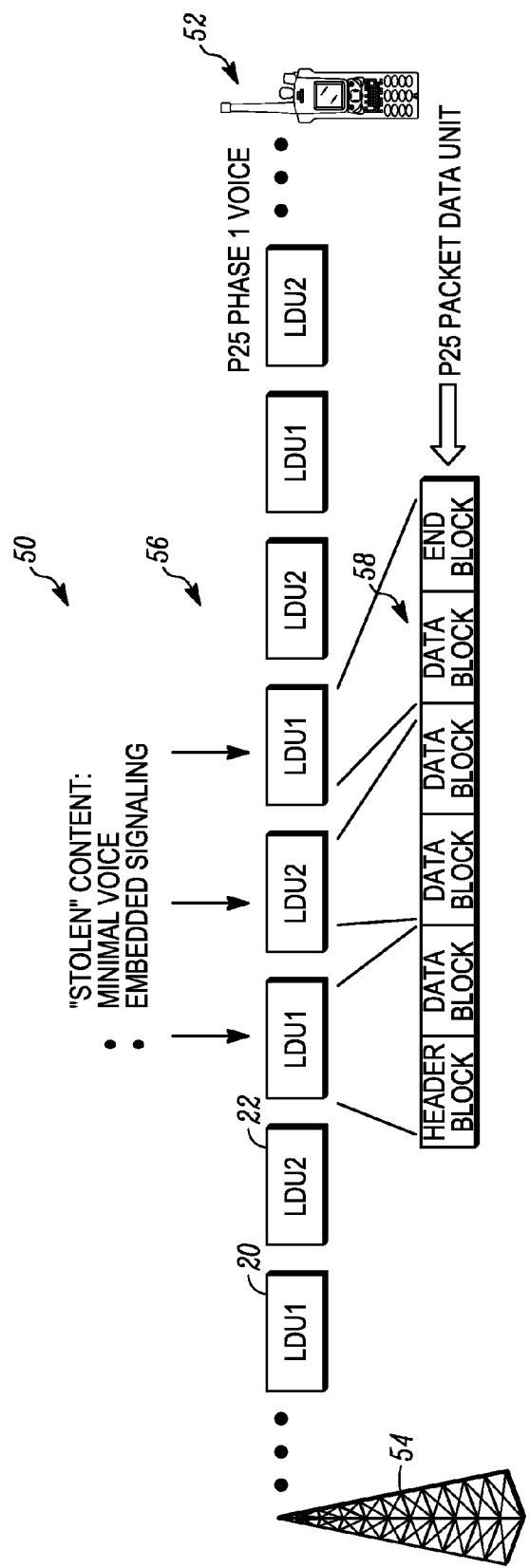
FIG. 6 is a schematic diagram of an exemplary operation of stealing bits during a voice transmission in a set manner in accordance with some embodiments.

FIG. 6 is a block diagram of an exemplary operation 50 of stealing bits during a voice transmission in a set manner in accordance with some embodiments. The exemplary operation 50 includes a subscriber unit (SU) 52 wirelessly communicating with fixed network equipment (FNE) 54. Specifically, the SU 52 and the FNE 54 are communicating a voice session 56 which includes the LDUs 20, 22 as described herein. In the exemplary operation 50, a P25 PDU 58 is included in the LDUs 20, 22 in a set manner using the various techniques described herein. The exemplary operation 50 is most useful for scenarios with long voice transmissions such as remote monitoring, emergency management (EM) hot microphone, etc. Again, to minimize the impact to audio quality, the stolen content can use one or more of the schedules and techniques described herein.

Figure 7:
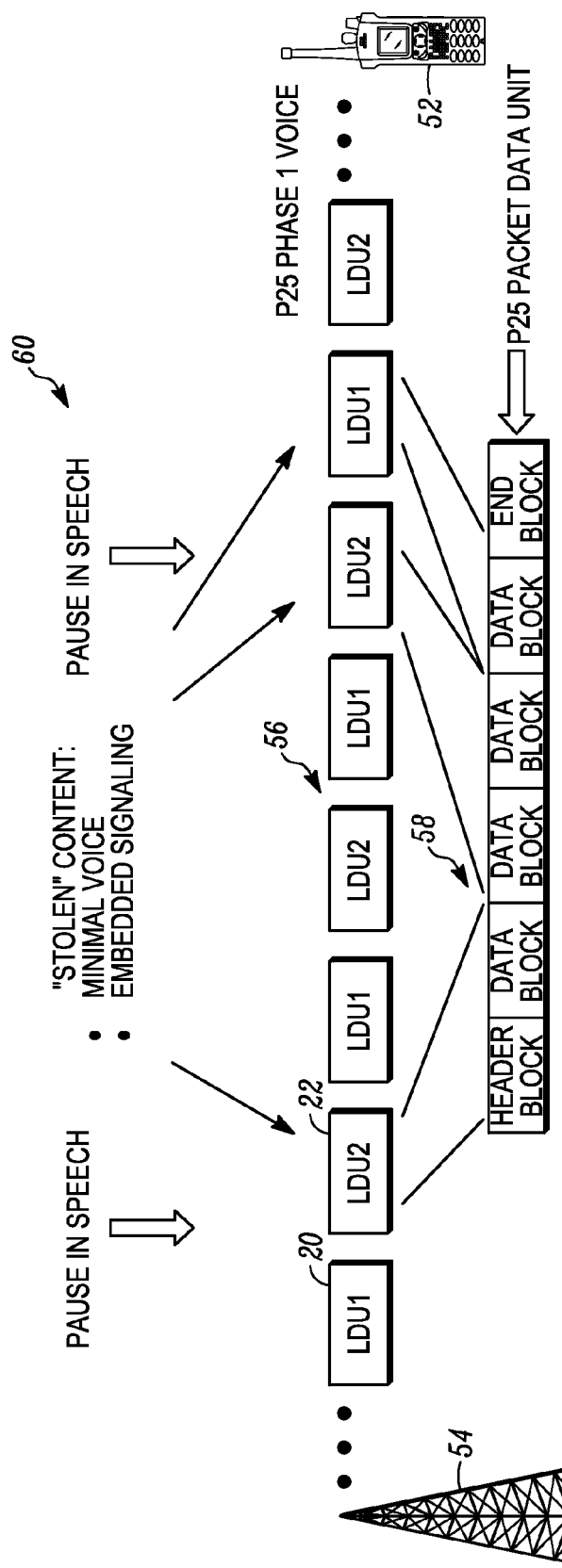
FIG. 7 is a block diagram of an exemplary operation of stealing bits during a voice transmission in an opportunistic manner in accordance with some embodiments.

FIG. 7 is a block diagram of an exemplary operation 60 of stealing bits during a voice transmission in an opportunistic manner in accordance with some embodiments. The exemplary operation 60 includes similar components as the exemplary operation 50. Here, the SU 52 and/or the FNE 54 look for pauses in speech or other voice content to transport portions of the P25 PDU 58. The exemplary operation 60 decreases the impact of lost bits on audio quality.

Figure 8:
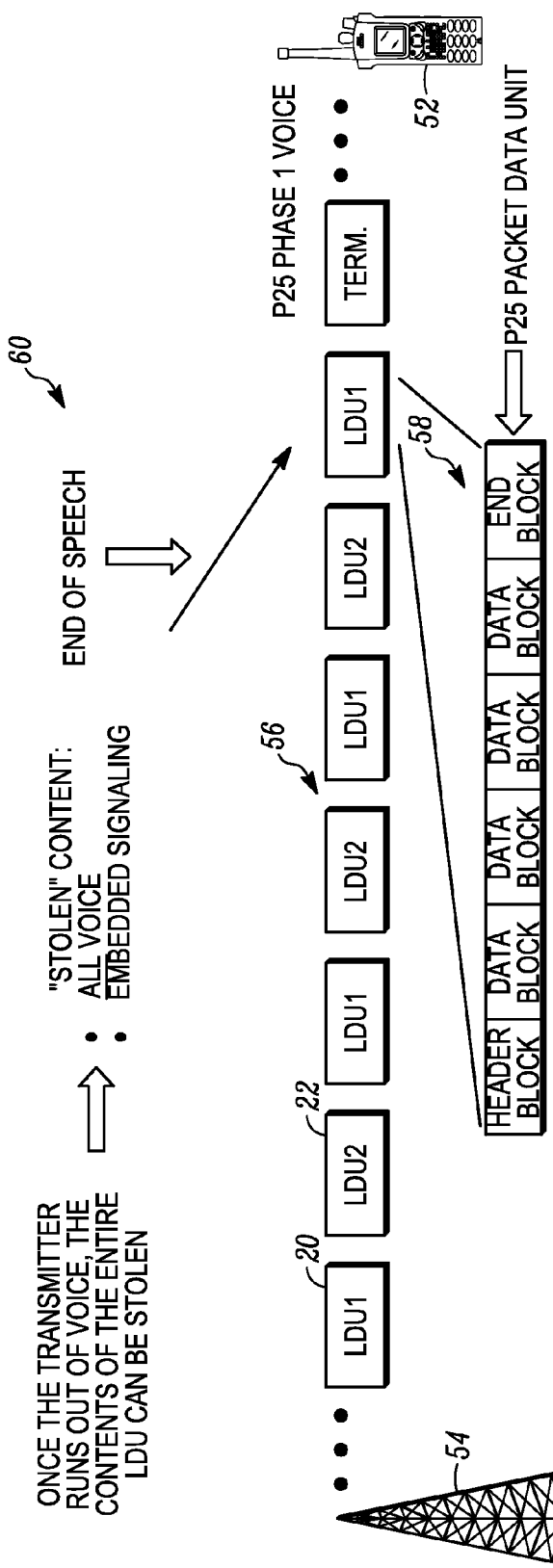
FIG. 8 is a block diagram of an exemplary operation of stealing bits at the end a voice transmission in accordance with some embodiments.

FIG. 8 is a block diagram of an exemplary operation 70 of stealing bits at the end a voice transmission in accordance with some embodiments. The exemplary operation 70 includes similar components as the exemplary operations 50, 60. Here, the exemplary operation 70 waits until the transmitter runs out of voice and the entire contents of the LDUs 20, 22 (i.e., voice and embedded signaling) can be stolen for data. The exemplary operation 70 leads to no impact to audio quality.

Figure 9:
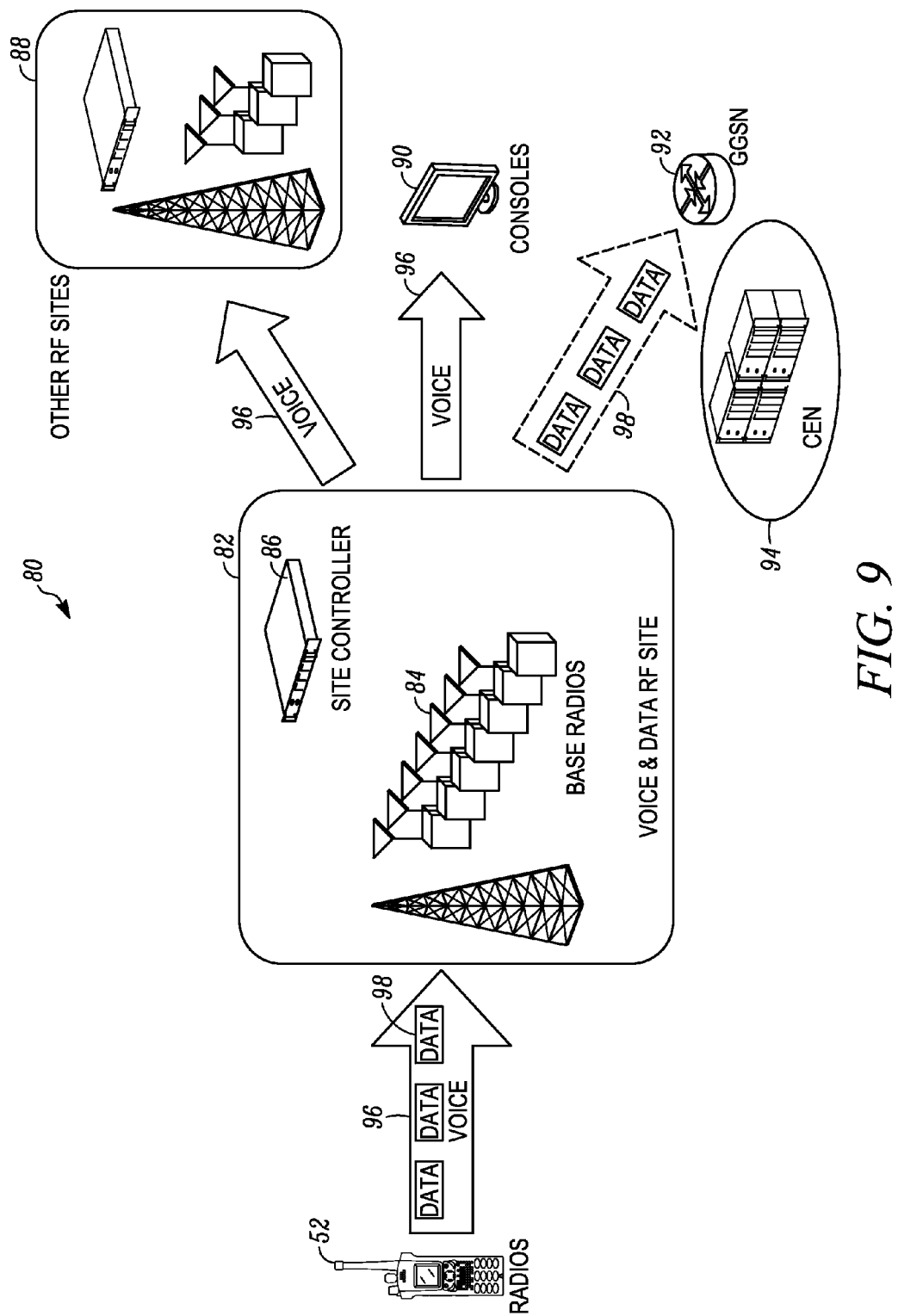
FIG. 9 is a network diagram of a network for routing concurrent voice and data for radio-to-infrastructure data in accordance with some embodiments.
Figure 10:
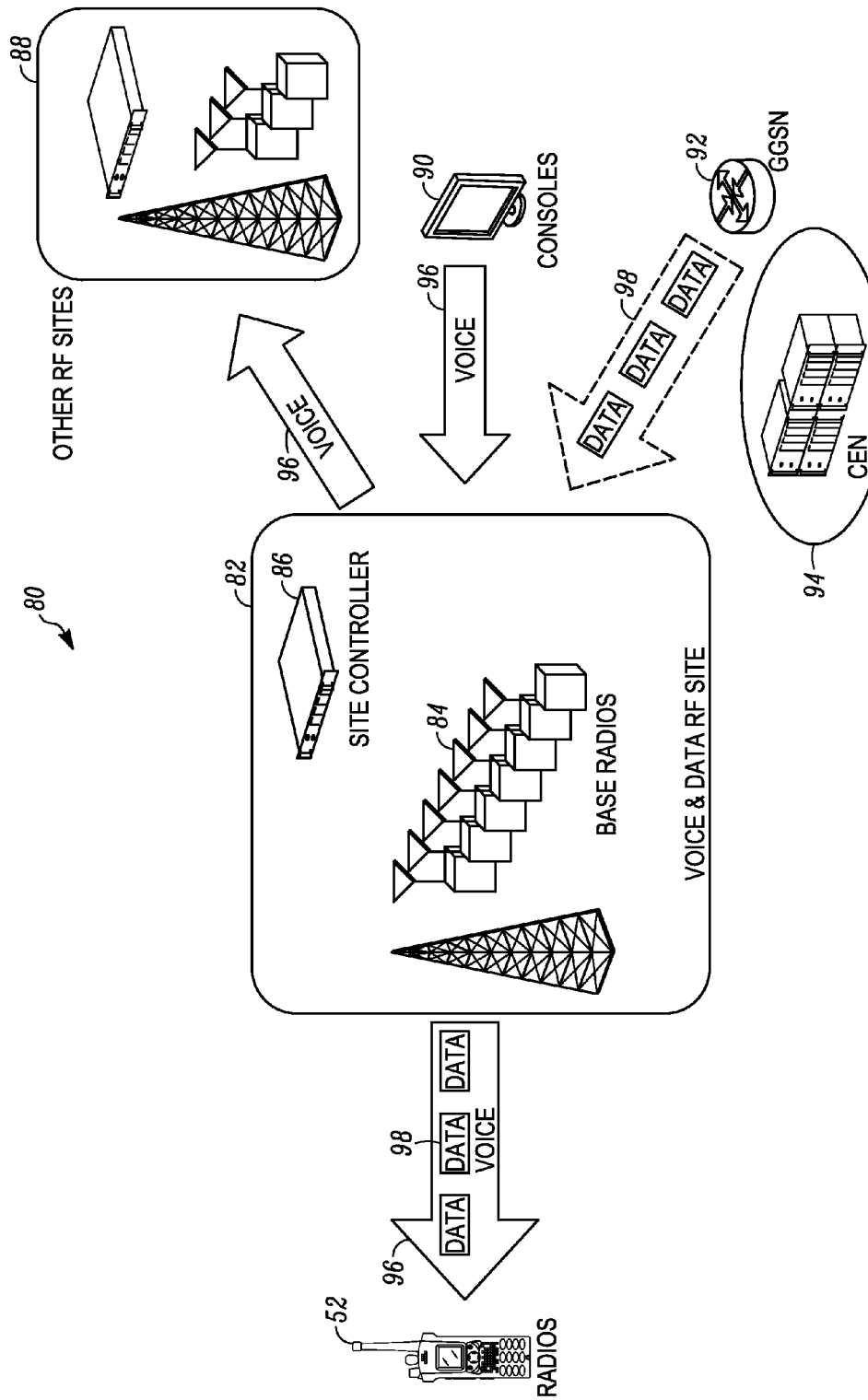
FIG. 10 is a network diagram of the network of FIG. 9 for routing concurrent voice and data for infrastructure-to-radio data in accordance with some embodiments.

FIGS. 9 and 10 are network diagrams of a network 80 for routing concurrent voice and data. FIG. 9 is a network diagram of the network 80 for routing concurrent voice and data for radio-to-infrastructure data in accordance with some embodiments. FIG. 10 is a network diagram of the network 80 for routing concurrent voice and data for infrastructure-to-radio data in accordance with some embodiments. The network 80 includes SUs 52 wirelessly communicating to a voice and data RF site 82. The RF site 82 includes base radios 84 and a site controller 86. The RF site 82 is also communicatively coupled to other RF sites 88, to consoles 90, and to a Gateway General packet radio service (GPRS) Support Node (GGSN) 92. The connections between the RF site 82, the other RF sites 88, the consoles 90, and the GGSN 92 can include wired connections, wireless connections, and a combination thereof. The other RF sites 88 can include similar components as the RF site 82 and can be wirelessly connected to other SUs (not shown). The console 90 can be similar in function to the SU 52, but in a fixed manner such as at a central command or the like. The GGSN 92 connects to a servers 94.

In FIG. 9, the SU 52 is actively transmitting voice data 96 with data PDUs 98 contained concurrently therein based on the aforementioned descriptions. In this radio-to-infrastructure data mode, the SU 52 and the RF site 82 work together beforehand to determine the schedule for the data PDUs 98 within the voice data 96 and the RF site 82 through the base radios 84 and the site controller 86 separate the voice data 96 and the data PDUs 98. Specifically, the data PDUs 98 are embedded within the voice data 96 on the over-the-air (OTA) interface between the SU 52 and the RF site 82. The RF site 82 sends the data PDUs 98 to the GGSN 92 and the voice data 96 to the other RF sites 88 and the console 90. The RF site 82 also replicates the signaling on the downlink and wireline that had been replaced by the SU 52 on the uplink, i.e. LC, ES, etc. In FIG. 9, for example, the SU 52 can be providing data such as location data or the like via the data PDUs 98 while concurrently transmitting the voice data 96.

In FIG. 10, the SU 52 is actively receiving voice data 96 with data PDUs 98 contained concurrently therein based on the aforementioned descriptions. In this infrastructure-to-radio data mode, the SU 52 and the RF site 82 work together beforehand to determine the schedule for the data PDUs 98 within the voice data 96 and the RF site 82 through the base radios 84 and the site controller 86 combine the voice data 96 and the data PDUs 98. Specifically, the data PDUs 98 are embedded within the voice data 96 on the over-the-air (OTA) interface between the SU 52 and the RF site 82. The RF site 82 receives the data PDUs 98 from the GGSN 92 and the voice data 96 from the console 90, for example. In FIG. 10, for example, the SU 52 can be receiving data such as telemetry data or the like via the data PDUs 98 while concurrently receiving the voice data 96. The network 80 is, of course, shown for illustration purposes and other exemplary embodiments can include additional components such as more SUs 52, additional RF sites, consoles 90, etc.

Figure 11:
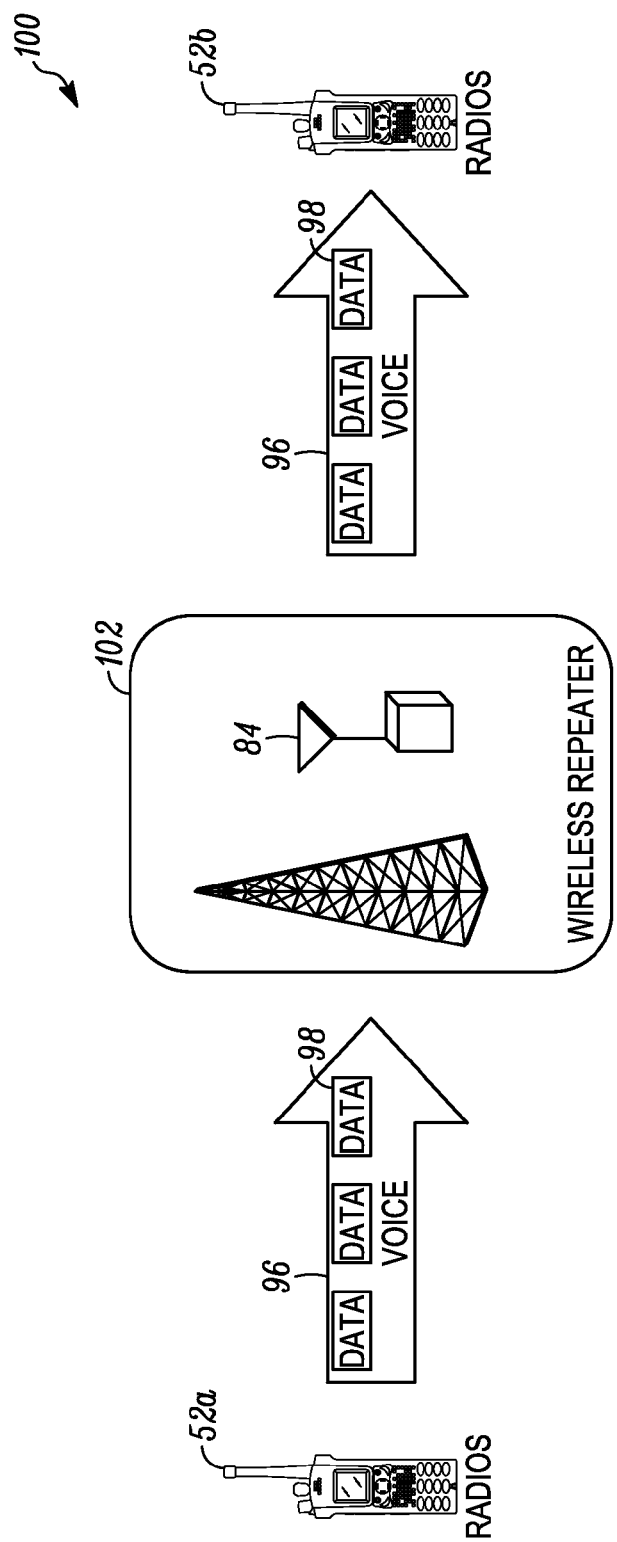
FIG. 11 is a network diagram of a network for routing concurrent voice and data in a radio-to-radio configuration in accordance with some embodiments.

FIG. 11 is a network diagram of a network 100 for routing concurrent voice and data in a radio-to-radio configuration in accordance with some embodiments. The network 100 includes a wireless repeater site 102 which connects a first SU 52a to a second SU 52b. The wireless repeater site 102 includes a base radio 84 which receives data from the SU 52a and forwards the data to the SU 52b. Note, in other exemplary embodiments, the wireless repeater site 102 can be omitted or the network 100 can include multiple repeater sites 102. In the network 100, the SU 52a is actively transmitting voice data 96 to the SU 52b while also concurrently transmitting data PDUs 98 to the SU 52b.

Figure 12:
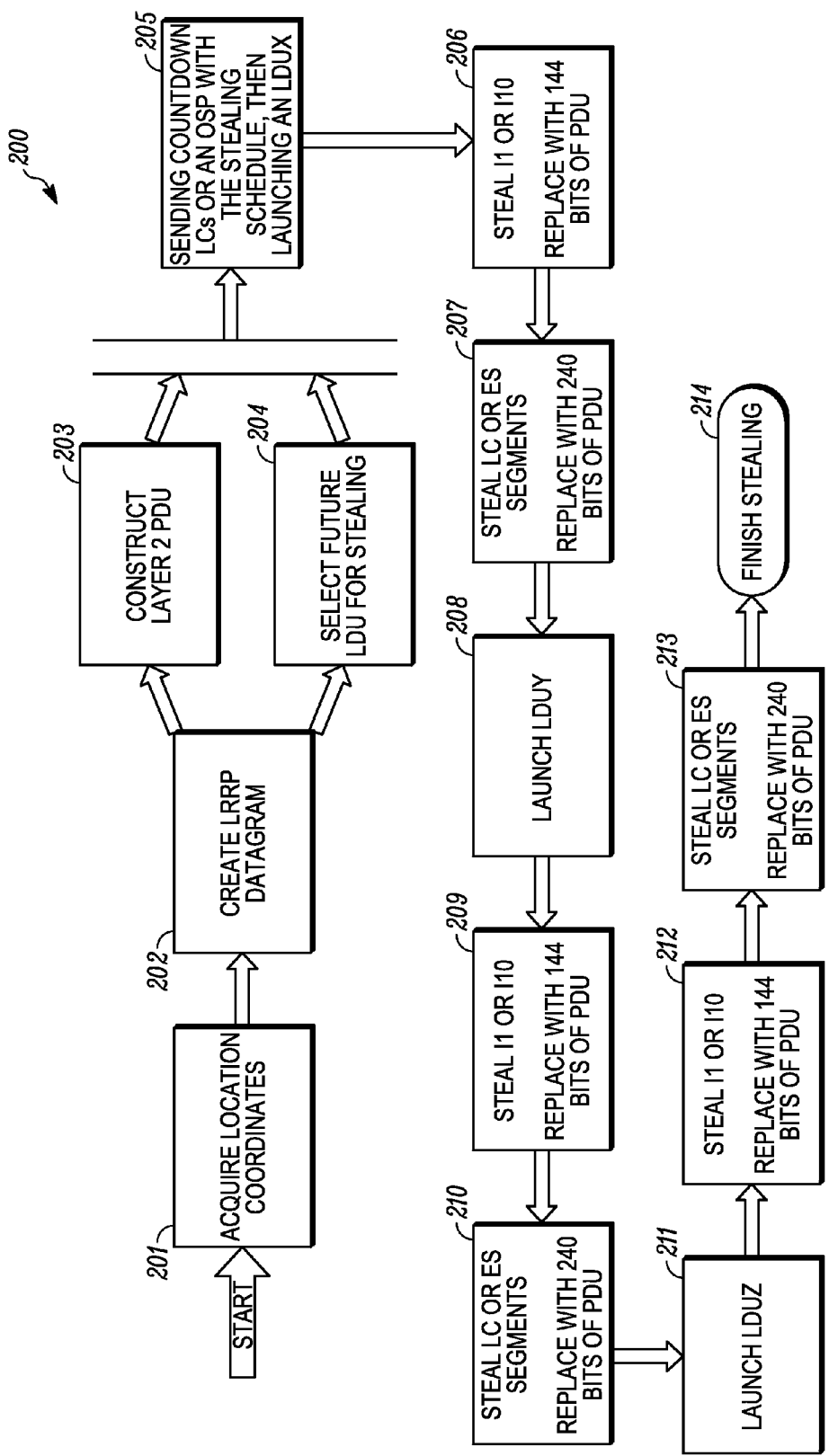
FIG. 12 is a flow diagram of a method for concurrently transmitting LRRP data over a P25 voice channel with associated voice data based on the systems and methods described herein in accordance with some embodiments.

FIG. 12 is a flow diagram of a method 200 for concurrently transmitting LRRP data over a P25 voice channel with associated voice data based on the systems and methods described herein in accordance with some embodiments. The method 200 can be implemented in the networks 80, 100, for example. LRRP is a protocol to send GPS updates to a CPS (Customer programming Software) defined Radio ID (i.e. destination address). While the method 200 is described with reference to LRRP data over a P25 voice channel, those of ordinary skill in the art will recognize the method 200 can be extended to other protocols, both for voice communications and for location updates. The method 200 starts by acquiring location coordinates (step 201). The location coordinates can be acquired via a GPS module integrated in the SU 52.

Next, the method 200 includes creating an LRRP datagram (step 202). The LRRP datagram includes the location coordinates. The method 200 next includes both constructing a Layer 2 PDU (step 203) and selecting a future LDU for stealing (step 204). The Layer 2 PDU includes the LRRP datagram, and the future LDU for stealing is selected based on the various techniques described herein. The method 200 includes sending countdown LCs or an OSP with the stealing schedule, then launching an LDUx (step 205). The LDUx represents the first LDU in the voice communication that has stolen bits for data. Here, the method 200 is at the selected future LDUx for stealing. The method 200 includes stealing I1 or I10 from the selected LDUx and replacing 144 bits of the Layer 2 PDU therein (step 206). Note, whether the method 200 steals I1 or I10 is based on whether the stealing start LDUx is an LDU1 or LDU2. Next, the method 200 steals LC or ES segments and replaces 240 bits of the Layer 2 PDU therein (step 207). Again, whether the method 200 steals LC or ES segments is based on whether the stealing start LDUx is an LDU1 or LDU2.

Next, the method 200 includes launching an LDUy (step 208). The LDUy is the next LDU stolen from after the LDUx. The method 200 includes stealing I1 or I10 from the selected LDUy and replacing 144 bits of the Layer 2 PDU therein (step 209). Again, whether the method 200 steals I1 or I10 is based on whether the LDUy is an LDU1 or LDU2. Next, the method 200 steals LC or ES segments and replaces 240 bits of the Layer 2 PDU therein (step 210). As noted earlier, whether the method 200 steals LC or ES segments is based on whether the LDUy is an LDU1 or LDU2. Next, the method 200 launches LDUz (step 211). The LDUz is the next LDU stolen from after the LDUy. The method 200 includes stealing I1 or I10 from the selected LDUz and replacing 144 bits of the Layer 2 PDU therein (step 212). Again, whether the method 200 steals I1 or I10 is based on whether the LDUz is an LDU1 or LDU2. Next, the method 200 steals LC or ES segments and replaces 240 bits of the Layer 2 PDU therein (step 213). As noted earlier, whether the method 200 steals LC or ES segments is based on whether the LDUy is an LDU1 or LDU2. Finally, the method 200 ends (step 214).

Figure 13:
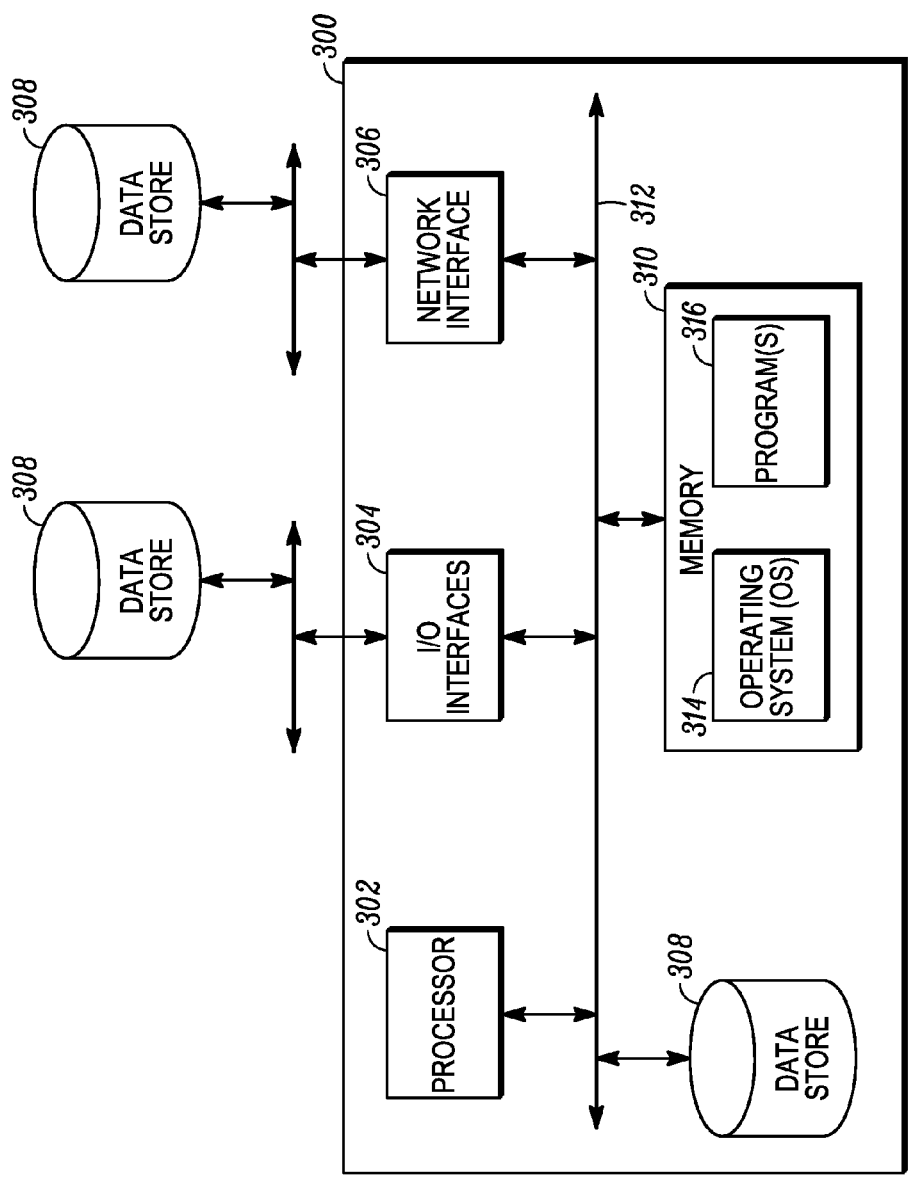
FIG. 13 is a block diagram illustrates an exemplary implementation of a server for the use with the network of FIGS. 9-11 and the like in accordance with some embodiments.

FIG. 13 is a block diagram illustrates an exemplary implementation of a server 300 for the use with the network 80, 100 and the like in accordance with some embodiments. For example, the server 300 can include or be part of the functionality of the base radios 84, the site controller 86, the servers 94, etc. The server 300 can be a digital computer that, in terms of hardware architecture, includes a processor 302, input/output (I/O) interfaces 304, a network interface 306, a data store 308, and memory 310. It should be appreciated by those of ordinary skill in the art that FIG. 13 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on a network, such as to communicate with other servers 14, 16 and/or with UEs. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Figure 14:
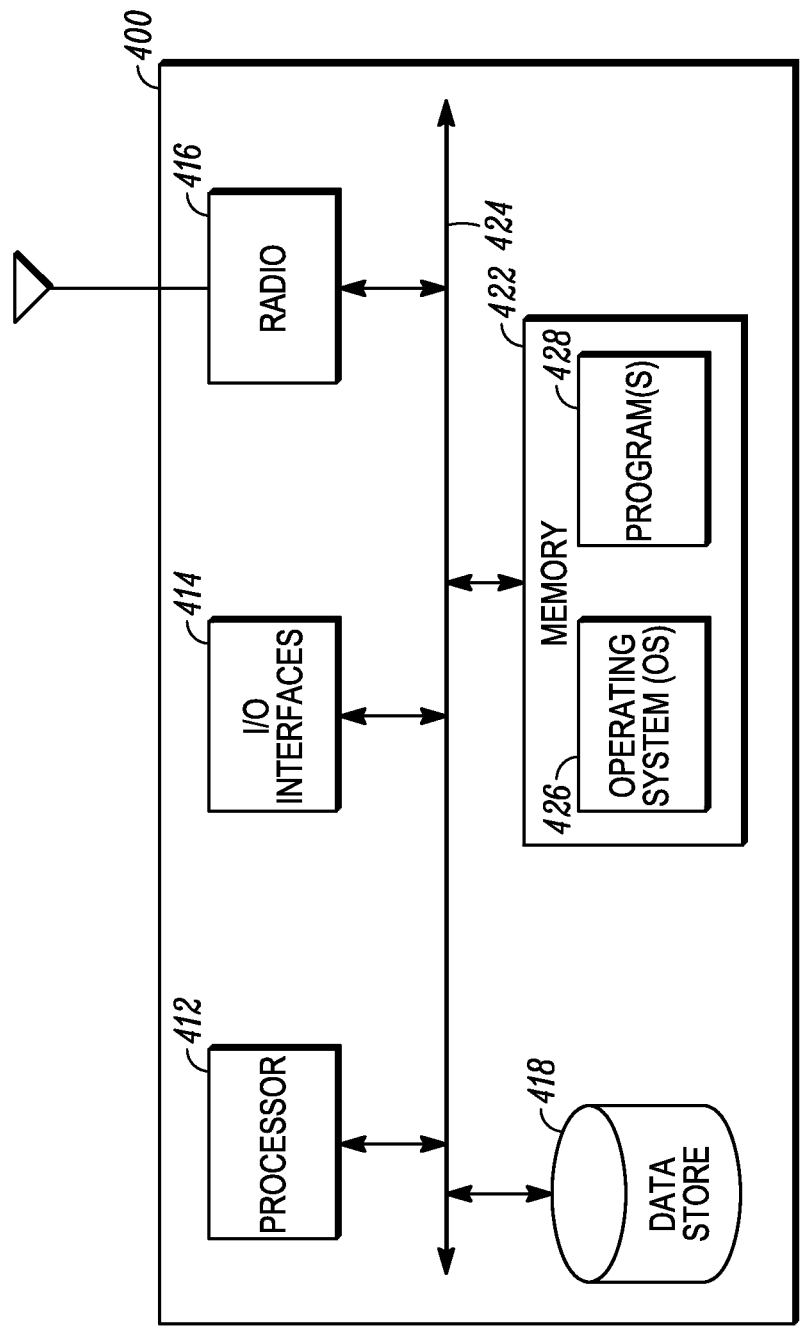
FIG. 14 is a block diagram of an exemplary implementation of a subscriber unit (SU) in accordance with some embodiments.

FIG. 14 is a block diagram of an exemplary implementation of a SU 400, such as SU 52, in accordance with some embodiments. The SU 400 can be a digital device that, in terms of hardware architecture, generally includes a processor 412, input/output (I/O) interfaces 414, a radio 416, a data store 418, and memory 422. It should be appreciated by those of ordinary skill in the art that FIG. 14 depicts the SU 400 in an oversimplified manner, and a practical embodiment can include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the SU 400, a semiconductor-based microprocessor (in the form of a microchip or chip set), or generally any device for executing software instructions. When the SU 400 is in operation, the processor 412 is configured to execute software stored within the memory 422, to communicate data to and from the memory 422, and to generally control operations of the SU 400 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the SU 400.

The radio 416 enables wireless communication to an external access device or network. Any number of suitable wireless data communication protocols, techniques, or methodologies can be supported by the radio 416, including, without limitation: RF; LMR; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; LTE; cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; P25; TETRA, DMR, proprietary wireless data communication protocols such as variants of Wireless USB; and any other protocols for wireless communication. The data store 418 can be used to store data. The data store 418 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 can incorporate electronic, magnetic, optical, and/or other types of storage media.

The memory 422 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 can have a distributed architecture, where various components are situated remotely from one another, but can be accessed by the processor 412. The software in memory 422 can include one or more software programs, each of which includes an ordered listing of executable instructions for implementing logical functions. In the example of FIG. 14, the software in the memory 422 includes a suitable operating system (O/S) 426 and programs 428. The operating system 426 essentially controls the execution of other computer programs, and provides scheduling, input-output control, file and data management, memory management, and communication control and related services. The programs 428 can include various applications, add-ons, etc. configured to provide end user functionality with the SU 400.

Figure 15:
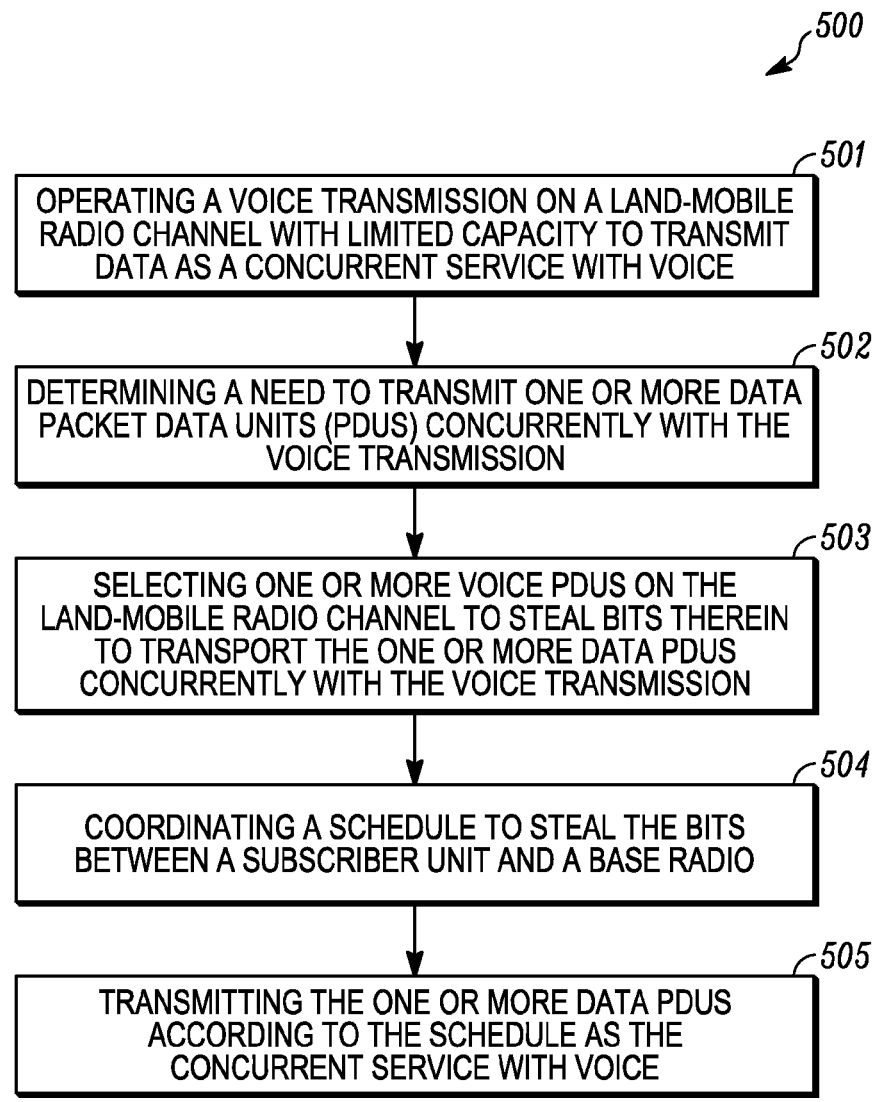
FIG. 15 is a flowchart of a method for concurrent voice and data on a land-mobile radio channel with limited capacity to transmit data as a concurrent service with voice in accordance with some embodiments.

FIG. 15 is a flowchart of a method 500 for concurrent voice and data on a land-mobile radio channel with limited capacity to transmit data as a concurrent service with voice in accordance with some embodiments. The method 500 can be performed in the network 80, 100 and/or with the SU 52 and the base radio 84. Alternatively, the method 500 can be performed with the SU 400 and/or the server 300. Other embodiments are also contemplated. The method 500 includes operating a voice transmission on a land-mobile radio channel with limited capacity to transmit data as a concurrent service with voice (step 501). Optionally, the land-mobile radio channel operates according to Project 25 (P25) such as either FDMA or TDMA.

The method 500 includes determining a need to transmit one or more data packet data units (PDUs) concurrently with the voice transmission (step 502). For example, the one or more data PDUs can be P25 data PDUs and the like. The data PDUs can be for a variety of applications such as real-time location updates and the like. Optionally, the one or more voice PDUs comprise one of a logical data unit 1 (LDU1) and a logical data unit 2 (LDU2). The method 500 includes selecting one or more voice PDUs on the land-mobile radio channel to steal bits therein to transport the one or more data PDUs concurrently with the voice transmission (step 503). The method 500 also includes coordinating a schedule to steal the bits between a subscriber unit and a base radio (step 504). The method 500 includes transmitting the one or more data PDUs according to the schedule as the concurrent service with voice (step 505).

Optionally, the schedule can include: stealing Link Control bits and Low Speed Data bits from the LDU1; and stealing Encryption Synchronization bits and Low Speed Data bits from the LDU2. Alternatively, the schedule can include: stealing first voice data bits I1, Link Control bits, and Low Speed Data bits from the LDU1; and stealing first voice data bits 110, Encryption Synchronization bits, and Low Speed Data bits from the LDU2. The method 500 can further include transmitting the one or more data PDUs from the subscriber unit to the base radio on an uplink based on the schedule; and replicating signaling in the one or more voice PDUs that was replaced with portions of the one or more data PDUs on a downlink, a wireline segment, or combinations thereof from the base radio.

The replicating can include: replacing Link Control fields populated with portions of the one or more data PDUs with a valid P25 Link Control message; and replacing Encryption Synchronization fields populated with portions of the one or more data PDUs with a correct value regenerated by the base radio. The method 500 can further include: combining the one or more data PDUs in a plurality of data blocks; performing forward error correction encoding on the plurality of data blocks; and interleaving the forward error correction encoded plurality of data blocks into the one or more voice PDUs. The method 500 can further include: interleaving the forward error correction encoded plurality of data blocks across multiple logical data units.

The method 500 can further include: indicating an availability of the concurrent service with voice between the subscriber unit and the base radio; and indicating an interleaving scheduling between the subscriber unit and the base radio. The method 500 can further include utilizing one of Link Control or broadcast Outbound Signaling Packet signaling to provide the availability and the interleaving scheduling. The method 500 can further include flexibly defining the schedule based on pauses in speech; and coordinating the schedule to steal the bits between the subscriber unit and the base radio via Link Control messages based on the flexibly defined schedule.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    transmitting a voice transmission on a land-mobile radio channel;
    determining a need to transmit one or more data packet data units (PDUs) concurrently with the voice transmission;
    selecting one or more voice PDUs on the land-mobile radio channel to steal bits therein to transport the one or more data PDUs concurrently with the voice transmission;
    coordinating a schedule to steal the bits between a subscriber unit and a base radio;
    transmitting the one or more data PDUs according to the schedule as the concurrent service with voice;
    transmitting the one or more data PDUs from the subscriber unit to the base radio on an uplink based on the schedule;
    replicating signaling in the one or more voice PDUs that was replaced with portions of the one or more data PDUs on a downlink, a wireline segment, or combinations thereof from the base radio;
    replacing Link Control fields populated with portions of the one or more data PDUs with a valid P25 Link Control message; and
    replacing Encryption Synchronization fields populated with portions of the one or more data PDUs with a correct value regenerated by the base radio.

2. The method of claim 1, wherein the land-mobile radio channel operates according to Project 25, and wherein the one or more voice PDUs comprise one of a logical data unit 1 (LDU1) and a logical data unit 2 (LDU2).

3. The method of claim 2, wherein the schedule comprises:
    stealing Link Control bits and Low Speed Data bits from the LDU1; and
    stealing Encryption Synchronization bits and Low Speed Data bits from the LDU2.

4. The method of claim 2, wherein the schedule comprises:
    stealing first voice data bits I1, Link Control bits, and Low Speed Data bits from the LDU1; and
    stealing first voice data bits I10, Encryption Synchronization bits, and Low Speed Data bits from the LDU2.

5. The method of claim 1, further comprising:
    combining the one or more data PDUs in a plurality of data blocks;
    performing forward error correction encoding on the plurality of data blocks; and
    interleaving the forward error correction encoded plurality of data blocks into the one or more voice PDUs.

6. The method of claim 5, further comprising:
    interleaving the forward error correction encoded plurality of data blocks across multiple logical data units.

7. A subscriber unit comprising:
    a wireless network interface;
    a processor communicatively coupled to the wireless network interface; and
    memory storing instructions that, when executed, cause the processor to perform the steps of:
    transmit, via the wireless network interface, a voice transmission on a land-mobile radio channel;
    determine a need to transmit one or more data packet data units (PDUs) concurrently with the voice transmission;
    select one or more voice PDUs on the land-mobile radio channel to steal bits therein to transport the one or more data PDUs concurrently with the voice transmission;
    coordinate a schedule to steal the bits with a base radio; and
    transmit, via the wireless network interface, the one or more data PDUs according to the schedule as the concurrent service with voice;
    flexibly define the schedule based on pauses in speech; and
    coordinate the schedule to steal the bits with the base radio via Link Control messages based on the flexibly defined schedule.

8. The subscriber unit of claim 7, wherein the land-mobile radio channel operates according to Project 25, and wherein the one or more voice PDUs comprise one of a logical data unit 1 (LDU1) and a logical data unit 2 (LDU2).

9. The subscriber unit of claim 8, wherein the schedule comprises:
    stealing Link Control bits and Low Speed Data bits from the LDU1; and
    stealing Encryption Synchronization bits and Low Speed Data bits from the LDU2.

10. The subscriber unit of claim 8, wherein the schedule comprises:
    stealing first voice data bits I1, Link Control bits, and Low Speed Data bits from the LDU1; and
    stealing first voice data bits I10, Encryption Synchronization bits, and Low Speed Data bits from the LDU2.

11. The subscriber unit of claim 7, wherein the instructions that, when executed, further cause the processor to perform the steps of:
    combine the one or more data PDUs in a plurality of data blocks;
    perform forward error correction encoding on the plurality of data blocks; and
    interleave the forward error correction encoded plurality of data blocks across multiple logical data units of the one or more voice PDUs.

12. The subscriber unit of claim 7, wherein the instructions that, when executed, further cause the processor to perform the steps of:
    indicate an availability of the concurrent service with voice to the base radio; and
    indicate an interleaving scheduling to the base radio.

13. The subscriber unit of claim 12, wherein the instructions that, when executed, further cause the processor to perform the steps of:
    utilize one of Link Control or broadcast Open Settlement Protocol signaling to provide the availability and the interleaving scheduling.

14. A method comprising:
    transmitting a voice transmission on a land-mobile radio channel;
    determining a need to transmit one or more data packet data units (PDUs) concurrently with the voice transmission;
    selecting one or more voice PDUs on the land-mobile radio channel to steal bits therein to transport the one or more data PDUs concurrently with the voice transmission;
    coordinating a schedule to steal the bits between a subscriber unit and a base radio; and
    transmitting the one or more data PDUs according to the schedule as the concurrent service with voice;
    indicating an availability of the concurrent service with voice between the subscriber unit and the base radio; and
    indicating an interleaving scheduling between the subscriber unit and the base radio;
    utilizing one of Link Control or broadcast Outbound Signaling Packet signaling to provide the availability and the interleaving scheduling.

15. A method comprising:
transmitting a voice transmission on a land-mobile radio channel;
determining a need to transmit one or more data packet data units (PDUs) concurrently with the voice transmission;
selecting one or more voice PDUs on the land-mobile radio channel to steal bits therein to transport the one or more data PDUs concurrently with the voice transmission;
coordinating a schedule to steal the bits between a subscriber unit and a base radio;
transmitting the one or more data PDUs according to the schedule as the concurrent service with voice; and
flexibly defining the schedule based on pauses in speech; and
coordinating the schedule to steal the bits between the subscriber unit and the base radio via Link Control messages based on the flexibly defined schedule.

* * * * *